United States Patent [19]
Denning et al.

[11] 3,864,220

[45] Feb. 4, 1975

[54] METHOD FOR REDUCING HYDROGEN ABSORPTION OF ZIRCONIUM BY ANODIZING

[75] Inventors: Richard F. Denning, Hastings; Stuart D. Bresnick, West Nyack, both of N.Y.

[73] Assignee: General Atomic Corporation, San Diego, Calif.

[22] Filed: Sept. 20, 1972

[21] Appl. No.: 290,508

Related U.S. Application Data
[63] Continuation of Ser. No. 112,473, Feb. 3, 1971, abandoned.

[52] U.S. Cl.................... 204/37 R, 176/38, 176/88, 176/91 R, 204/38 A
[51] Int. Cl........................................ C23b5/52
[58] Field of Search................... 204/37 R, 38 A; 29/195 M; 176/91 R, 38, 88

[56] References Cited
UNITED STATES PATENTS 3,159,556  12/1964  McLean et al.................. 204/38 A
3,259,558  7/1966  Hagiwara et al................. 204/38 A

FOREIGN PATENTS OR APPLICATIONS

| | | |
|---|---|---|
| 1,198,166 | 8/1965 | Germany |
| 1,241,646 | 11/1959 | France |
| 1,321,646 | 6/1973 | Great Britain |
| 2,034,863 | 1/1971 | Germany |
| 994,440 | 6/1965 | Great Britain |

*Primary Examiner*—Howard S. Williams
*Assistant Examiner*—W. I. Solomon
*Attorney, Agent, or Firm*—Pennie & Edmonds

[57] ABSTRACT

Zirconium and zirconium alloys are treated to reduce the amount of hydrogen absorption which normally occurs when these materials are subjected to certain hydrogen containing environments; for example, as nuclear reactor structural elements. The zirconium or zirconium alloy object is first anodized to form a protective anodized film on its surface. The object is then heat treated in an atmosphere containing a sufficient amount of oxygen to impart an oxide film to the object surface.

10 Claims, No Drawings

METHOD FOR REDUCING HYDROGEN ABSORPTION OF ZIRCONIUM BY ANODIZING

This is a continuation of application Serial No. 112,473, filed Feb. 3, 1971 and now abandoned.

BACKGROUND OF THE DISCLOSURE

I. Field of the Invention

This invention relates to a method for protecting zirconium and zirconium alloys, and more particularly, to a method for protecting zirconium and zirconium alloys from hydrogen embrittlement.

II. Description of Prior Art

Zirconium and zirconium alloys possess several characteristics which make these materials extremely useful as structural materials in a nuclear reactor assembly. For example, its low cross section for thermal neutrons as compared to such commonly used materials as aluminum and iron, good mechanical properties at elevated temperatures, and a relatively low coefficient of thermal expansion and therefore a minimum amount of thermal stresses. There are, however, disadvantages which prevent zirconium from being ideally suited for use in a nuclear reactor.

One of the most significant of these disadvantages is the effect which trace amounts of entrapped hydrogen has on the mechanical properties of zirconium and zirconium alloys. Amounts of hydrogen as low as about 70 p.p.m. in zirconium have exhibited detrimental embrittling effects. When zirconium structural parts are used in water cooled reactors they are particularly susceptible to the effect of hydrogen embrittlement. For example, when zirconium or a zirconium alloy is used as a cladding for nuclear fuel elements and the hydrogen content of the cladding becomes excessive, impact properties of the cladding are reduced and failure can occur.

Several methods for protecting zirconium from hydrogen embrittlement have been suggested. One such method involves coating the zirconium or zirconium alloy part with one or more layers of various corrosion resistant materials. While these coatings are effective in reducing hydrogen embrittlement, they present the disadvantage of brittle layers of intermetallic compounds which form at elevated temperatures between the zirconium and those materials used to protect the zirconium. The end result is that the adherence of the coatings to the zirconium is poor and sections of the coating break off exposing the zirconium to attack.

Several methods have been suggested for anodizing zirconium and zirconium alloys. For example, U.S. Pat. Nos. 1,787,672, 3,063,917, 2,234,111 and 3,371,021 are illustrative of some of these known methods. However, these processes fail to provide a method for effectively protecting zirconium from hydrogen absorption.

It is therefore, the principal object of this invention to overcome the disadvantages stated hereinabove by providing an improved method for protecting zirconium and zirconium alloys from hydrogen absorption.

SUMMARY OF THE INVENTION

The present invention contemplates a relatively simple and efficient method for protecting zirconium and zirconium alloys from hydrogen absorption and thus for increasing the life expentancy of a zirconium structural part when used, for example, in a water-cooled nuclear reactor.

Broadly stated, the method for reducing hydrogen pick-up of zirconium or zirconium alloy in accordance with the present invention comprises placing an object consisting of zirconium or a zirconium alloy as an anode in an aqueous acidic electrolytic bath. A sufficient voltage is applied across the anode to cause the formation of an anodized film on the object. The anodized object is then heat treated in an atmosphere containing a sufficient amount of oxygen to impart an oxide film to the object surface without causing substantially any hydrogen absorption.

DESCRIPTION OF THE PREFERRED EMBODIMENTS

The zirconium or zirconium alloy objects are anodized in accordance with the present invention by inserting the zirconium object as an anode in an aqueous acidic electrolytic bath. Any of the standard electrolytic solutions for anodizing zirconium or zirconium alloys can be used for the anodizing operation. We have found that an aqueous solution containing 1 percent by weight of phosphoric acid is eminently suitable.

The specific voltage applied during the anodizing procedure and the length of time during which the voltage is applied, of course, depends upon several variables, one of which is the composition of the electrolyte. However, the zirconium object should be anodized at a sufficient voltage and for a sufficient period of time so that after the anodizing treatment substantially all of the exposed zirconium surface is coated with an anodized film. For example when using an aqueous solution containing 1 percent phosphoric acid as the anodizing solution, anodizing for 1 minute at 25 volts is usually sufficient to form the protective anodized film.

After the anodizing operation, the zirconium object is subjected to a heat treating operation to form a thermally treated oxidized film on the object. The heat treatment comprises heating the anodized zirconium object at elevated temperatures in an atmosphere containing a sufficient amount of oxygen to impart an oxide film to the surface thereof. Any oxygen containing atmosphere that would not itself cause an increase in the hydrogen content of the object can be used. For example, an atmosphere of air has been found to be eminently suitable as a heat treating atmosphere. Also, we have found in accordance with the present invention that any inert gas, e.g. helium, argon, etc. containing approximately 2 to 3 percent by volume of oxygen can be used as the heat treating atmosphere.

To provide a surface oxide protective film on the anodized zirconium object, the zirconium object is heat treated in the oxygen containing atmosphere at atmospheric pressure at temperatures ranging from approximately 350° to 410°C for periods of time ranging from approximately 4 to 24 hours. We have found that heat treating the anodized zirconium object for approximately 16 hours at 370°C provides a surface oxide film thickness just above the thin-film interference-color region which is eminently suitable.

The invention will be described in detail with reference to the following example for illustrative purposes:

EXAMPLE

Several samples consisting of Zircaloy-2 tubing were first mechanically polished and then degreased. These Zircaloy-2 samples were divided into groups and surface treated as follows: The first group of samples was anodized followed by heat treating in an oxygen containing atmosphere. The anodizing procedure referred to in Table I consists of anodizing for one minute at 25 volts in a 1 percent by weight phosphoric acid aqueous bath. The second group of samples was heat treated in an oxygen containing atmosphere. The third group of samples had no preliminary anodizing or heat treatment. The hydrogen pick-up of these samples after they were exposed to 1500 psi of steam at 400°C are shown in Table I.

TABLE I

| Preliminary Surface Preparation | Total Weight Gain (Including Gain from Preliminary Surface After 74 Days of Steam Exposure (mg/dm²) | Hydrogen Pick-up (mg/dm²) |
|---|---|---|
| Anodize + heat treat for 5 hours at 450°C in air | 65 | 1.3 |
| heat treat for 5 hours at 450°C in air | 62 | 1.9 |
| None | 70 | 2.4 |

Zircaloy-2 Hydrogen Absorption from Exposure to 1500 psi of steam at 400°C

The Zircaloy-2 samples which were anodized and then heat treated in accordance with the present invention exhibited approximately 30 percent less hydrogen absorption than the samples which were just subject to an oxidizing heat treatment and approximately 45 percent less hydrogen absorption than the samples which had no preliminary treatment.

We claim:

1. A method for reducing hydrogen absorption and embrittlement of zirconium and zirconium alloy nuclear reactor structural elements which comprises forming at least a portion of a nuclear reactor structural element from a metal selected from the group consisting of zirconium and zirconium alloys, placing said metal portion of said structural element as an anode in an aqueous acidic electrolytic bath, applying a sufficient voltage across said anode to cause the formation of an anodized film on the said metal portion of said structural element and heat treating the anodized metal portions of said structural element in an atmosphere of at least one of air and inert gas containing about 2 to 3 percent oxygen by volume to impart an oxide film to the surface thereof without causing substantially any hydrogen absorption, and thereafter incorporating said structural element in a nuclear reactor.

2. A method according to claim 1 wherein the metal portion is anodized in an aqueous bath containing about 1 percent by weight phosphoric acid.

3. A method according to claim 1 wherein a voltage of 25 volts is applied for about one minute to form the anodized film.

4. A method according to claim 1 wherein the zirconium alloy is Zircaloy-2.

5. A method according to claim 1 wherein the anodized metal portion is heat treated at a temperature of about 350° to 410°C for about 4 to 24 hours.

6. A method according to claim 1 wherein the anodized metal portion is heat treated at a temperature of about 370°C for about 16 hours.

7. A nuclear reactor structural element produced by the method of claim 1.

8. A method for reducing hydrogen absorption and embrittlement of zirconium and zirconium alloy nuclear reactor structural elements which comprises placing a metal selected from the group consisting of zirconium and zirconium alloys as an anode in an aqueous acidic electrolytic bath, applying a sufficient voltage across said anode to cause the formation of an anodized film on the surface of said metal, heat treating the anodized metal in an atmosphere of at least one of air and inert gas containing about 2 to 3 percent oxygen by volume to impart an oxide film to the surface thereof without causing substantially any hydrogen absorption, forming a nuclear structural element with the treated material, and thereafter using said structural element in a nuclear reactor.

* * * * *

UNITED STATES PATENT OFFICE
CERTIFICATE OF CORRECTION

PATENT NO. : 3,864,220
DATED : February 4, 1975
INVENTOR(S) : Richard F. Denning & Stuart D. Bresnick It is certified that error appears in the above-identified patent and that said Letters Patent are hereby corrected as shown below:

The Assignee in the above-identified patent is listed as "General Atomic Corporation" - it should be listed as --General Atomic Company--.

Signed and sealed this 1st day of July 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,864,220
DATED : February 4, 1975
INVENTOR(S) : Richard F. Denning and Stuart D. Bresnick It is certified that error appears in the above-identified patent and that said Letters Patent are hereby corrected as shown below:

In Col. 3, at Table I, the subheading:

"Preliminary Surface
 Preparation
 (mg/dm$^2$)"

should read:

--Preliminary Surface
  Preparation--

In Col. 3, at Table I, the subheading:

"Total Weight Gain (In-
 cluding Gain from Prelimin-
 ary Surface
 After 74 Days of Steam
 Exposure (mg/dm$^2$)"

should read:

--Total Weight Gain (In-
  cluding Gain from Prelimin-
  ary Surface Preparation)
  After 74 Days of Steam
  Exposure (mg/dm$^2$)--

In Col. 3, at Table I, the subheading:

"Hydrogen
 Pick-up
 Preparation)"

should read:

--Hydrogen
  Pick-up
  (mg/dm$^2$)--

Signed and Sealed this twenty-ninth Day of June 1976

[SEAL]

Attest:

RUTH C. MASON
Attesting Officer

C. MARSHALL DANN
Commissioner of Patents and Trademarks